US011841029B2

(12) United States Patent
Ludwig (10) Patent No.: US 11,841,029 B2
(45) Date of Patent: Dec. 12, 2023

(54) AXIAL SLIDING BEARING ARRANGEMENT FOR A PUMP IMPELLER OF A RADIAL PUMP AND A RADIAL PUMP COMPRISING THE AXIAL SLIDING BEARING ARRANGEMENT

(71) Applicant: NIDEC GPM GMBH, Auengrund OT Merbelsrod (DE)

(72) Inventor: Paul Michael Ludwig, Erfurt (DE)

(73) Assignee: NIDEC GPM GMBH, Auengrund OT Merbelsrod (DE)

( * ) Notice: Subject to any disclaimer, the term of this patent is extended or adjusted under 35 U.S.C. 154(b) by 141 days.

(21) Appl. No.: 17/395,586

(22) Filed: Aug. 6, 2021

(65) Prior Publication Data
US 2022/0049713 A1 Feb. 17, 2022

(30) Foreign Application Priority Data
Aug. 13, 2020 (DE) .......................... 102020121332.8

(51) Int. Cl.
*F04D 29/20* (2006.01)
*F04D 29/046* (2006.01)

(52) U.S. Cl.
CPC ........... *F04D 29/20* (2013.01); *F04D 29/046* (2013.01)

(58) Field of Classification Search
CPC ...... F04D 29/041; F04D 29/046; F04D 29/20; F04D 29/628
See application file for complete search history.

(56) References Cited

U.S. PATENT DOCUMENTS

| | | | | |
|---|---|---|---|---|
| 4,865,529 | A * | 9/1989 | Sutton | F04D 13/04 417/409 |
| 6,439,845 | B1 * | 8/2002 | Veres | A61M 60/178 416/185 |
| 10,348,157 | B2 * | 7/2019 | Ehrsam | H02K 3/522 |
| 10,830,242 | B2 * | 11/2020 | Ehrsam | F04D 1/00 |
| 2014/0072414 | A1 * | 3/2014 | Koegel | F04D 29/0467 415/170.1 |
| 2018/0119703 | A1 | 5/2018 | Gashi | |

(Continued)

FOREIGN PATENT DOCUMENTS

| | | |
|---|---|---|
| DE | 270114 A1 | 7/1989 |
| DE | 102018104015 A1 | 8/2019 |

(Continued)

OTHER PUBLICATIONS

Office Action issued by the GPTO for German priority application Nr. DE 10 2020 121 332.8 dated May 19, 2021.

*Primary Examiner* — David E Sosnowski
*Assistant Examiner* — Jason G Davis
(74) *Attorney, Agent, or Firm* — Harness, Dickey & Pierce, P.L.C.

(57) ABSTRACT

Axial sliding bearing arrangement for a pump impeller (8) of a radial pump (1) with a first, rotating friction surface (22) pointing in an axial direction (A), a second, non-rotating friction surface (23) facing the first, rotating friction surface (22), wherein the second, non-rotating friction surface (23) is allocated to a swivel head body (20), wherein the swivel head body (20) is axially supported via an axial support surface (24), and the swivel head body (20) is radially supported in a resiliently yielding manner at radial support surfaces (25) by means of first spring means (31).

26 Claims, 10 Drawing Sheets

(56) References Cited

U.S. PATENT DOCUMENTS

| | | | |
|---|---|---|---|
| 2020/0080571 A1 | 3/2020 | Graichen et al. | |
| 2021/0079920 A1 | 3/2021 | Pawellek | |
| 2021/0190135 A1 | 6/2021 | Pawellek et al. | |

FOREIGN PATENT DOCUMENTS

| | | |
|---|---|---|
| DE | 102018204503 A1 | 9/2019 |
| DE | 102019213724 A1 | 3/2020 |
| DE | 102018123901 A1 | 4/2020 |

\* cited by examiner

AXIAL SLIDING BEARING ARRANGEMENT FOR A PUMP IMPELLER OF A RADIAL PUMP AND A RADIAL PUMP COMPRISING THE AXIAL SLIDING BEARING ARRANGEMENT

CROSS-REFERENCE TO RELATED APPLICATIONS

This application claims the benefit and priority of German Patent Application 102020121332.8, filed Aug. 13, 2020. The entire disclosure of the above application is incorporated herein by reference.

FIELD

The invention relates to an axial sliding bearing arrangement for a pump impeller of a radial pump according to the preamble of claim 1 and to a radial pump comprising the axial sliding bearing arrangement.

BACKGROUND

A generic axial bearing arrangement for a water pump is known from DE 10 2018 123 901 A1. Axial forces generated hydraulically during operation, which pull a motor shaft of a drive motor, together with the pump impeller attached thereto on the pump side, in the direction of an intake connection of the pump, are absorbed, in the case of the technology of the above-mentioned document, by a run-up of an end face of the motor shaft onto an axial bearing projection. As seen in the radial direction, the axial bearing projection is disposed centrally on the longitudinal axis of the inlet of the water pump. In particular in the case of water pumps with a higher continuous output, axial forces arise, the constant support of which can overload such an axial bearing system. For example, in such a case, exceeding the permissible pv-value can lead to undesired development of heat and therefore to undesired wear.

A centrifugal pump with a sound-damping pump impeller bushing with rubber insulation is known from DE 10 2019 213 724 A1. A pump-side shaft end of a drive shaft is mounted in an radially elastic manner in a receiver on the intake connection by means of an O-ring. Axial forces which arise are absorbed via a shaft shoulder and friction discs, wherein the blow-out discs are located in a pump housing region around the above-mentioned receiver. The radially elastic mounting of a free end of a drive shaft serves to minimise noise. In the case of such an axial bearing, e.g. an undesired angular offset of a bearing axis of the drive shaft relative to the axial support surfaces can lead to excessive surface pressures on one side. In this way, any exceeding of the pv-value is a risk which in turn can lead to increased wear and to increased heat development.

A coolant pump with an axial bearing arrangement and improved heat balance in relation thereto is known from DE 10 2018 104 015 A1. The axial bearing arrangement is optimised with respect to the frictional heat produced in that only a rounded free shaft end of a drive shaft, on which the pump impeller sits, can be supported against an axial bearing seat, e.g. an axial bearing block, in the centre of the intake connection. In particular, in the case of relatively high axial forces occurring, relatively little heat is produced owing to the almost punctiform support, but in particular in the case of high-performance coolant pumps, a relatively high surface pressure in this sliding-point contact is disadvantageous.

In particular, in the case of the above-mentioned prior art solutions, as a result of at least partial increased point loading at the friction point, permissible pv-values can be exceeded or in any case are greatly increased. In particular in respect of electric water pumps with high electric connection power levels of e.g. 400 W or more, this results in increased wear or even material failure. Such water pumps above the stated power range develop hydraulically generated high axial forces of up to ca. 150 N on the axial sliding bearing. If wear or material failure occurs, a possibility of undesired abrasion owing to a small gap dimension between the pump impeller and the pump housing cannot be ruled out, whereby abrasive glass fibres, which are embedded e.g. in the material of the pump impeller, can be released. Such abrasive glass fibres can then undesirably enter the coolant circuit. Furthermore, in the event of wear, an increased friction moment during run-up can result. Furthermore, axial bearings from the prior art can be loaded on one side owing to manufacturing tolerances and/or positional tolerances, e.g. coaxiality and/or angle errors of a non-rotating axial sliding bearing surface with respect to a rotating axial sliding bearing surface, and therefore the exceeding of a permissible pv-value in some areas cannot be reliably avoided. This holds the danger of undefined wear on the axial sliding bearing and, in the worst case, material failure.

An object of the invention is thus to provide an axial sliding bearing arrangement for a pump impeller of a radial pump, which makes available a sufficiently large contact surface between a rotating friction surface and a non-rotating friction surface. In particular, the axial bearing arrangement in accordance with the invention should be able to compensate for shape and/or bearing tolerances, e.g. with respect to parallelism and/or concentricity, and make a defined friction state achievable. Furthermore, it is an object of the invention to avoid an undesired increase or even an exceeding of the permissible pv-value.

Furthermore, it is an object of the invention to provide a radial pump which avoids the disadvantages mentioned above in the prior art. In particular, high-performance radial pumps should be specified, which, with the axial bearing arrangement in accordance with the invention, can compensate for manufacturing-imposed shape and/or bearing tolerances, and in particular can sustain high axial forces, e.g. 150 N or more, in combination with high rotational speeds, e.g. 7000 rpm or more over a required operating duration of e.g. at least 8000 hours. Furthermore, simple lubrication and cooling of the friction point by coolant to be pumped should be feasible.

The above-mentioned objects are achieved with respect to the axial sliding bearing arrangement with an axial sliding bearing arrangement having the features of claim 1. Advantageous embodiments are given in the claims dependent thereon. With respect to the radial pump, the above-mentioned objects are achieved by a radial pump having the features of claim 19. Advantageous embodiments are given in the claims dependent thereon.

An axial sliding bearing arrangement in accordance with the invention for a pump impeller of a radial pump comprises: a first, rotating friction surface pointing in an axial direction A, a second, non-rotating friction surface facing the first, rotating friction surface, wherein the second, non-rotating friction surface is allocated to a swivel head body, and the swivel head body is axially supported via an axial support surface, and the swivel head body is radially supported in a resiliently yielding manner at radial support surfaces by means of first spring means.

With the axial sliding bearing arrangement in accordance with the invention, friction partners, i.e. the first, rotating friction surface and the second, non-rotating friction surface, can be formed to be tolerance-compatible with respect to their position in relation to each other. The swivel head body, which provides the static (non-rotating) friction surface, is received in a pivotable/tiltable manner by radially resilient mounting in combination with axial end-face support so that it can adapt as necessary to present angle tolerances in order to come into contact with the corresponding rotating friction surface by its design-imposed, maximally possible non-rotating friction surface.

Furthermore, the design of the axial bearing arrangement in accordance with the invention creates the possibility of providing a friction surface area larger than in conventional bearings so that corresponding surface pressures are reduced.

As a result, higher axial forces can be absorbed without permissible pv-values of the axial bearing being exceeded. This opens up the possibility of providing long-lasting bearings rotating at high speeds.

Furthermore, owing to the spring means, which act on the radial support surfaces of the swivel head body, defined, distinctive tilting points for the articulated mounting of the swivel head can be provided.

Furthermore, in this way, fixing of the swivel head in a form-fitting manner in the rotation direction relative to the spring elements can be achieved, whereby unintentional conjoint rotation of the swivel head is prevented. The resilient holding of the swivel head is also advantageous in the case of assembly, e.g. of a cooling water pump, in which the axial sliding bearing arrangement in accordance with the invention is used, since during the assembly process, the swivel head is fixed in a non-positive manner and can therefore be captively held.

In particular, it is of specific advantage for the usage purpose in the case of radial pumps that e.g. in order to mount the radial pump motor or its motor shaft, a radial sliding bearing unit with an oil-impregnated sintered bearing and grease-lubricated lip seals is possible. In this way, the implementation of the dry-runner principle is easily possible. In addition, it is possible to dispense with a leakage reservoir.

A further advantage is a compact and highly integrated construction for the axial sliding bearing arrangement.

In particular, for use in a radial pump, the bearing friction point, i.e. the contact surface between the rotating friction surface and the non-rotating friction surface, can be lubricated and cooled particularly easily using the coolant fluid to be pumped.

Further advantages are a possible decoupling of axial tolerance chains or prevention of the overdetermined construction in the axial direction by the possibility of integrating the first, rotating friction surface into a bushing element (see below e.g. of a pump impeller of the radial pump).

Further advantages are particularly low-noise operation since an axial roller bearing or even a radial roller bearing (when used in a radial pump) can be dispensed with.

Furthermore, the interpositioning of a swivel head offers the possibility of using sintered materials for the friction partners since the pump shaft itself is not a friction partner for the axial bearing when the axial sliding bearing arrangement in accordance with the invention is used, as is possible, in a radial pump.

Moreover, the disadvantages known from the prior art mentioned in the introduction, in particular for the use of radial pumps constructed as higher-performance cooling fluid pumps, can be avoided or at least reduced.

According to one advantageous embodiment, the axial support surface is supported by means of point contact in the axial direction.

In support of the above-mentioned advantages and in particular in rendering possible or in facilitating the angular offset capability of the swivel head body, this swivel head body is supported with an axial support surface by means of point contact in the axial direction. Such (non-frictional) punctiform axial support is clearly less critical in terms of wear than frictional (dynamic) point support.

In a further particular embodiment, the axial support surface is axially supported in a rigid manner except for material elasticity or in a resiliently yielding manner.

The axial support surface can be rigid, in particular can be rigidly connected for the application of higher support forces. Nevertheless it is also possible to resiliently support this axial support surface, in particular in the case of changing axial loading of a unit to be supported, in order to be able to compensate for axial play if necessary. The resilient support is naturally to be selected with respect to its spring stiffness in such a way that axial forces which arise can be reliably supported.

In a further preferred embodiment, the first, rotating friction surface is formed larger, i.e. with a larger area, with respect to an end surface of a shaft to be mounted.

By this measure, the friction surfaces, in particular the rotating friction surface, can be made significantly larger and therefore the surface pressure thereof under axial loading can be reduced. This further contributes towards the reduction in wear.

A further embodiment is characterised in that the rotating friction surface is allocated to a rotary bushing configured and formed to interact in an axially fixed manner, and for conjoint rotation, with the shaft to be mounted.

The allocation of a rotating friction surface to a rotary bushing, which can—in an axially fixed manner and for conjoint rotation with the shaft to be mounted—e.g. be placed or pressed onto said shaft, facilitates the connection of the first, rotating friction surface to a jointly-rotating component, e.g. a pump impeller of a radial pump.

A further embodiment is characterised in that the second, non-rotating friction surface is allocated to a friction portion of the swivel head body, and/or the axial support surface and the radial support surfaces are allocated to a holding portion of the swivel head body.

An above-described division of the swivel head body into functional portions (friction portion/holding portion) makes it possible to allocate and constructively to assign optimised properties to the corresponding portions, which properties are particularly conformed to the respective purposes of the portions. Thus e.g. the swivel head body as a whole or even merely in the region of the friction portion can be formed from a particularly wear-resistant material, e.g. a ceramic or the like. In the region of the holding portion of the swivel head body there is no relative movement, or only extremely little relative movement, in relation to adjoining components and so, both with respect to the material and also with respect to the geometry this swivel head body can be particularly conformed easily.

In a further embodiment, the holding portion has a smaller radial extension than the friction portion of the swivel head body.

With the above-mentioned measure, sufficient holding of the swivel head body can be ensured when the geometric dimensions of the holding portion are small and yet a large friction surface (non-rotating friction surface) can be provided in the region of the friction portion.

In a further preferred embodiment, the swivel head body is pivotable with its longitudinal axis in at least one direction by an angle α>0° to the axial direction A, in particular is pivotable against the first spring means.

The geometric dimensions are preferably conformed such that normal angle offset positions of the angle α, which in practice deviates from 0°, can be absorbed. In this way, corresponding angle errors, which in practice are never totally unavoidable, can be absorbed without one-sided overloading of the interacting friction surfaces occurring.

In a further advantageous embodiment, the angle (α) is >0° and less than or equal to 2°.

In practice, the angle α can be between 0° and 2° depending on the construction. In an advantageous manner, the corresponding radial/axial movement of the swivel head body is then conformed thereto.

In a further embodiment, a spring stiffness of the first spring means is configured such that with normally occurring axial support forces within the axial sliding bearing arrangement, an angular shift of the second, non-rotating friction surface takes place such that a design-imposed maximally possible contact surface between the rotating friction surface and the non-rotating friction surface occurs, i.e. at least one abutment without an angular offset (full contact) of the two friction surfaces takes place.

With the above-mentioned measures, in dependence upon the normal use, suitable spring stiffness levels can be selected, by means of which on the one hand necessary angled shifting owing to angle offset tolerances is made possible and therefore full-surface angle offset-free contact between the two friction surfaces takes place and on the other hand the friction moment-imposed turning moment is supported at the swivel head body.

In a further specific embodiment, the axial support surface is supported with a spherical or cap-shaped, in particular a spherical cap-shaped, support element.

With the above-mentioned measures, the axial support surface and therefore the whole swivel head body can be provided under the provision of the point contact (non-frictional; static) already mentioned above. A combination of the curved surface on the support element or the formation of the support element as a body comprising round surfaces makes it possible to design the geometry of the support surface of the swivel head body in a simple manner. In the simplest case, this can therefore be flat.

In a further preferred embodiment, the first spring means are spring arms free at one end or connected at both ends.

With the above-mentioned measure, in particular the provision of the spring means can be realised easily. For example, the spring arms connected at one end or both ends can be formed from a stamped sheet metal or deformed part, which, if necessary, can be formed as a bushing or similar holding element. Therefore, in particular all spring means can also be provided integrally with a one-piece component.

According to an advantageous embodiment, the holding portion is formed, as viewed in cross-section, circularly, ovally or polygonally, and a plurality of first spring means interacts in a manner dispersed over a periphery U of the holding portion with its radial support surfaces.

With the above-mentioned measures the swivel head body can easily be held via the correspondingly geometric shape of the holding portion in the rotation direction in a manner for conjoint rotation with the spring means and so frictional rotational loading between the axial support surface of the swivel head body and the support element is reliably avoided.

The possibility exists of forming the axial support surface of the holding portion of the swivel head body in a convex manner.

The above-mentioned measure shows a possibility of producing the static point support of the swivel head body by means of a rounded design for the axial support surface on the side where the swivel head body is.

In a particularly preferred embodiment, at least the first spring means or the first spring means and the support element are integrally formed as a bearing bushing.

The above-mentioned measure contributions to a reduction in the required number of components and thus leads to simpler assembly.

Furthermore, it is advantageously possible to hold the support element in the bearing bushing in a radially resiliently yielding manner by means of a second spring means.

In particular in the case of particularly low-rotational speed applications, it can be useful to hold the support element itself also in a radially yielding manner in order to be able to compensate for lower-frequency oscillations which may occur or elastic deformations of the motor shaft owing to high loading and therefore possibly a radial displacement of the contact point between the swivel head body and the support element.

In a further preferred embodiment, the first spring means respectively interact with flat or arched flat sides of the holding portion.

The above-mentioned measure also serves to ensure that the swivel head body is secured against rotation relative to the spring elements on the one hand and by the rounded design in order to define a clear tilting point or a clear tilt plane on the other hand.

In a preferred manner, the swivel head body is held for conjoint rotation in a rotation direction around a longitudinal axis L.

In this way, the contact between the swivel head body and the support element can be reliably held in a static manner without a relative movement in the rotation direction taking place between these elements.

A radial pump in accordance with the invention comprises an axial sliding bearing arrangement according to one of the embodiments described above.

Owing to the use of the axial sliding bearing arrangement in accordance with the invention and the embodiments thereof, the radial pump in accordance with the invention has the same advantages as already described above in relation to the axial sliding bearing arrangement.

In a particularly preferred embodiment, the swivel head body is radially and axially supported with respect to a pump housing.

The above-mentioned measure shows a possible application for the axial sliding bearing arrangement in accordance with the invention, wherein the swivel head body is supported in the pump housing.

It is particularly preferred to form the rotary bushing as one piece with the pump impeller.

The embodiment already mentioned above means that the rotary bushing must be disposed on the side where the pump impeller is in order to orientate the rotating friction surface thereof in a manner corresponding to the non-rotating friction surface of the swivel head body. It is useful to form the rotary bushing as one piece with the pump impeller of the radial pump. In particular, in this case, the casting or pressing of a metal, ceramic or otherwise wear-resistant rotary bushing in a synthetic material or light metal pump impeller may be considered.

In a particularly advantageous embodiment, the rotary bushing has at least one groove at the first, rotating friction surface.

In order to lubricate the rotary bushing relative to the swivel head body it may be useful to provide the rotary bushing with a groove via which it is possible, when assembling the axial sliding bearing arrangement within the pump housing, to lubricate the frictional contact by means of the actual cooling fluid to be pumped.

It is particular advantageous if the swivel head body is disposed radially in a bearing portion in the region of an inlet of the radial pump.

The above-mentioned arrangement of the swivel head body is particularly preferred on the one hand in relation to flow technology and also with respect to accessibility during assembly.

In a further preferred embodiment, the support element is axially supported at the base of a bearing recess or at the base of the bearing bushing.

This also contributes to simplified assembly owing to good accessibility.

DRAWINGS

The invention will be described in more detail hereinunder with the aid of the drawing. In the drawing.

Figure 1:
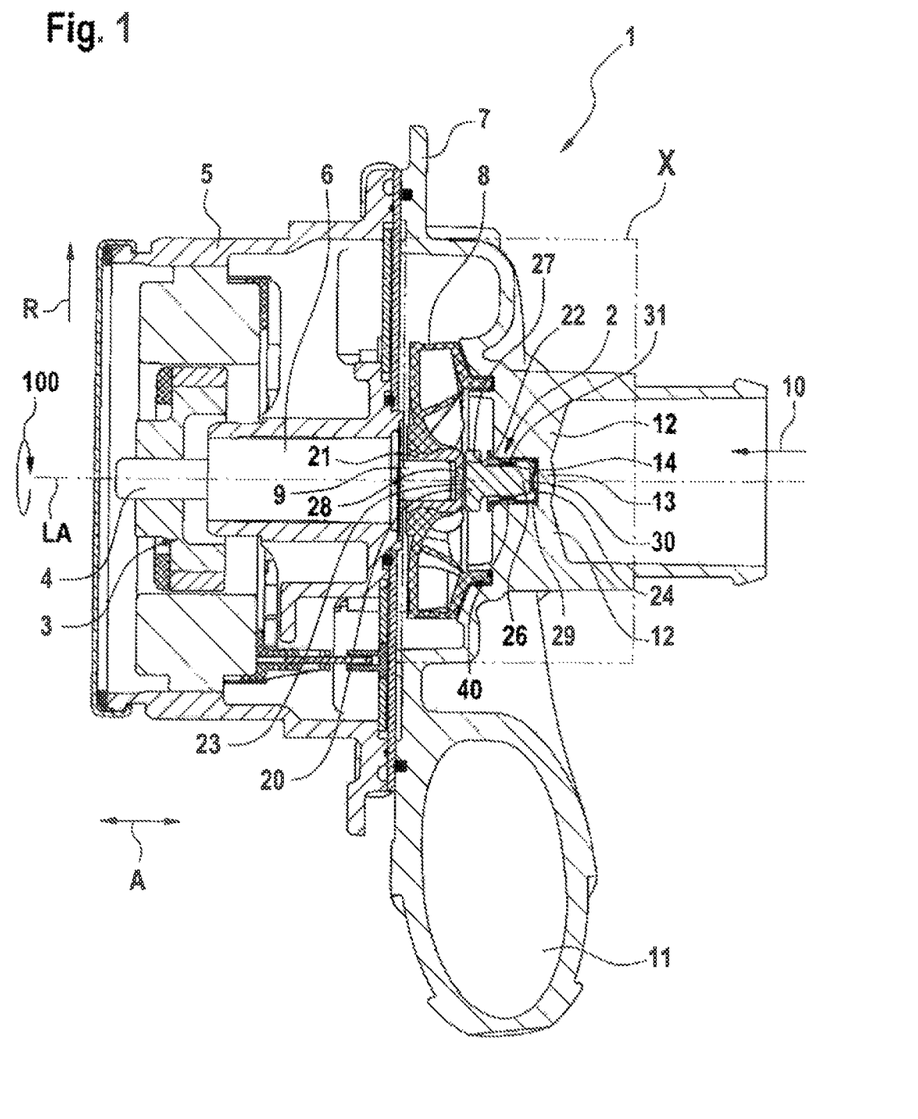
FIG. 1 shows a longitudinal cross-sectional view through a radial pump in accordance with the invention comprising the axial sliding bearing arrangement in accordance with the invention.

FIG. 1 shows a radial pump 1 in accordance with the invention in the embodiment as a coolant pump. The radial pump 1 comprises an axial sliding bearing arrangement 2 in accordance with the invention and, in the embodiment according to FIG. 1, is designed as an electrically driven dry-runner pump.

A drive motor 3 drives a shaft 4 which is mounted to rotate in a rotation direction 100 about its longitudinal axis LA. For this purpose, an encapsulated radial sliding bearing 6 is provided within a motor housing 5 and is e.g. lubricated for life.

A pump housing 7 is placed against the motor housing 5, and a pump impeller 8 is disposed in the pump housing. The pump impeller 8 is connected to a pump-side shaft journal 9 of the shaft 4 in an axially fixed manner and for conjoint rotation therewith, and is driven in rotation by said journal.

The pump housing 7 has an inlet 10 through which fluid to be pumped is drawn in by means of the radial pump 1. The fluid to be pumped leaves the pump housing 7 through a pump outlet 11.

Holding struts 12, which extend radially inwards from the inlet 10 (cf. also FIGS. 4 and 5), hold a bearing portion 13, which has a bearing recess 14, centrally with respect to the inlet 10.

The radial pump 1 comprises the axial sliding bearing arrangement 2 in order to absorb axial forces, in particular axial forces generated hydraulically during pumping. Such hydraulically generated axial forces are orientated in such a way during operation of a radial pump 1 that they push/pull the pump impeller 8 together with the shaft 4 away from the motor housing 5 towards the pump housing 7.

In order to support such axial forces, the axial sliding bearing arrangement 2 in accordance with the invention provides a swivel head body 20. A rotary bushing 21 is provided on the pump impeller 8 or connected as one piece to the pump impeller 8. The rotary bushing 21 has an end face which, as seen in the axial direction A, is orientated towards the inlet 10. Let this end face be designated hereinunder as the first, rotating friction surface 22. This first, rotating friction surface 22 is driven in rotation in the rotation direction 100 by the drive motor 3. A second, non-rotating friction surface 23 is allocated to the first, rotating friction surface 22 in an opposing manner and pointing towards the first, rotating friction surface 22. The second, non-rotating friction surface 23 is part of the swivel head body 20. Opposite to the second, non-rotating friction surface 23, the swivel head body 20 has an axial support surface 24. The axial support surface 24 is allocated together with the radial support surfaces 25 to a holding portion 26 of the swivel head body 20. The second, non-rotating friction surface 23 is allocated to a friction portion 27 of the swivel head body 20. As seen in a radial direction R, the friction portion 27 of the swivel head body 20 has a larger radial extension than the holding portion 26.

The holding portion 26 can be rounded in cross-section. However, in a particularly preferred manner, specifically with respect to the form-fitting holding of the holding portion 26 in the rotation direction 100, this holding portion has in cross-section—as described hereinunder—a non-circular cross-section, in particular an oval or preferably a polygonal cross-section.

The friction portion 27 is dimensioned with respect to its extension in the radial direction R at least such that the second, non-rotating friction surface 23, with respect to its two-dimensional extension, can interact over as large a surface as possible with the first, rotating friction surface 22. In particular, the radial extension of these two surfaces is selected in such a way that it is clearly greater than an axial end face 28 of the shaft journal 9 and so friction surfaces are provided which are enlarged with respect to this end face 29.

The holding portion 26 is seated in a bearing bushing 29. The bearing bushing 29 is formed e.g. as a stamped sheet metal part and is essentially of a sleeve shape closed at one end, i.e. a pot or cup shape, the base surface of which is formed as contact surface 30. In the embodiment of FIG. 1, the contact surface 30 is cap-shaped and so between the contact surface 30 of the bearing bushing 29 and the axial support surface 24, which is flat, a static point contact prevails.

In the rotation direction 100, first spring means 31, which protrude radially a distance inwards from the bearing bushing 29, are supported on the radial support surfaces 25 of the swivel head body 20 for conjoint rotation therewith. Therefore, the swivel head body 20 is held in a resiliently biassed manner in the radial direction R by a plurality of first spring means 31 and is supported in the axial direction A in a form-fitting manner towards the inlet 10.

During pre-assembly of the radial pump 1 the inserted bearing bushing 29, which is preferably pressed in the bearing portion 13, can therefore hold the swivel head body 20 captively in a radially resiliently biassed manner, i.e. in a frictionally engaged manner.

During assembly of a pump housing 7 prepared in this manner against the motor housing 5, wherein the pump impeller 8 with the rotary bushing 21 is already mounted on the shaft journal 9, the first, rotating friction surface 22 is therefore placed against the second, non-rotating friction surface 23.

The construction of the drive motor 3 is imposed by design in such a way that, owing to present magnetic forces even at a standstill, a magnetically generated axial force acts upon the shaft 4 which is orientated in the direction of the swivel head body 20 and so a defined contact is established between the first, rotating friction surface 22 and the second, non-rotating friction surface 23. Furthermore, the two friction surfaces 22, 23 are located in the region of the pump housing 7 through which fluid flows and so the friction contact between these friction surfaces 22, 23 can be lubricated and cooled by the fluid to be delivered, in particular the cooling fluid in the case of a coolant pump.

For a more detailed description, let reference be additionally made to the enlarged illustration of the detail X (FIG. 2) of the embodiment of the axial sliding bearing arrangement 2 of FIG. 1.

Figure 2:
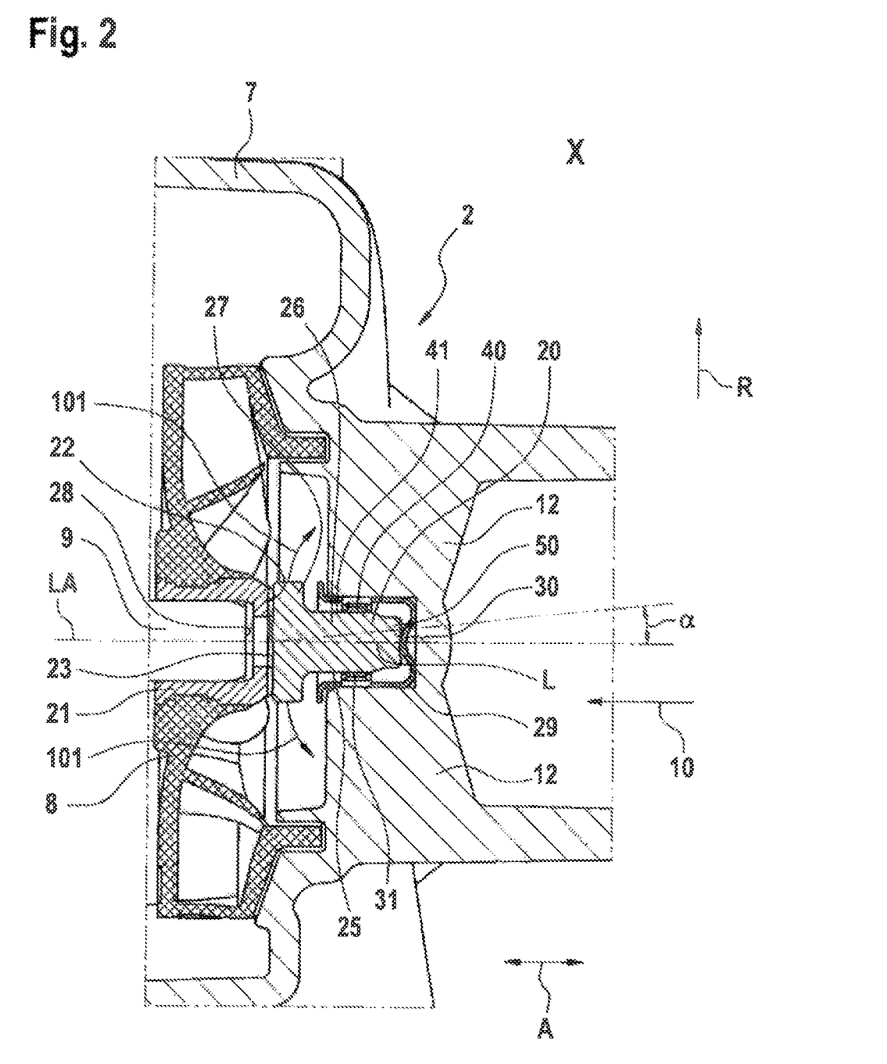
FIG. 2 shows a detail X from FIG. 1 in a first embodiment.

In particular, the bearing bushing 29 comprises, as described above, spring arms 40 as the first spring means 31, which arms are placed, being resilient in the radial direction R, against flat sides 41 which act as radial support surfaces 25.

The contact surface 30, which in the present embodiment is formed as a spherical cap-shaped or, more generally, as a cap-shaped surface, is formed within the production of the bearing bushing 29 as a curvature in the base wall of the bearing bushing 29 and is therefore formed integrally as a support element 50 integrated into the bearing bushing 29.

In particular in the detailed illustration of the Figures, in the present case of FIG. 2, a longitudinal axis L of the swivel head body 20 is orientated in alignment with the longitudinal axis LA of the drive motor 3 and without an angular offset thereto. Owing to manufacturing tolerances and/or assembly tolerances positional tolerances with respect to the coaxiality of the longitudinal axes L, LA and angular offset (positional tolerances with respect to angle α) may possibly occur. Let the angle α be assumed to be an angle of a notional tolerance-encumbered longitudinal axis of the swivel head body 20 and of the theoretically ideal longitudinal axis L of the swivel head body 20, which is ideally orientated in line with and coaxial to the longitudinal axis LA of the shaft 4, i.e. of the drive motor 3. Although such an angle is undesirable, it can and will be found to a slight extent in practice. In particular, the present invention is designed to compensate for angle offset errors for angles α of greater than or equal to 0° to less than or equal to 2°. This is possible with the axial sliding bearing arrangement in accordance with the invention since the swivel head body 20 is held in a radially resilient manner by the spring arms 40 and is supported in an axially punctiform manner on the support element 50 which, in the present exemplified embodiment, is formed as a spherical cap-shaped sheet metal structure.

In this way, the swivel head body 20 can be pivoted a distance in the arrow directions 101 against the force of the first spring means 31 if such an angle offset α occurs. In the present example, the rotary bushing 21 is cast into the pump impeller 8 by means of an axially and/or circumferentially form-fitting contour and surrounds the end face 28 of the shaft journal 9.

In the case of such a pivotable bearing, its tilt point or tilt range can be predetermined by geometrical allocation of the first spring means 31 together with the particularly punctiform contact at the support element 50.

In the embodiment according to FIGS. 1 and 2 (first embodiment) the first spring means 31, i.e. the spring arms 40 (cf. FIG. 4), are formed as radial clear-cut penetrations of the bearing bushing 29 and so they act as spring arms 40 connected at both ends. The resilient property thereof is geometrically imposed and is effected by the curvature of the spring arm bridges (i.e. the spring arms 40 connected at both ends). These spring arms 40 interact with the corresponding radial support surfaces 25, in particular the corresponding flat sides 41 of the holding portion 26 of the swivel head body 20. The bearing sleeve 29 sits in the bearing recess 14 of the bearing portion 13.

Figure 4:
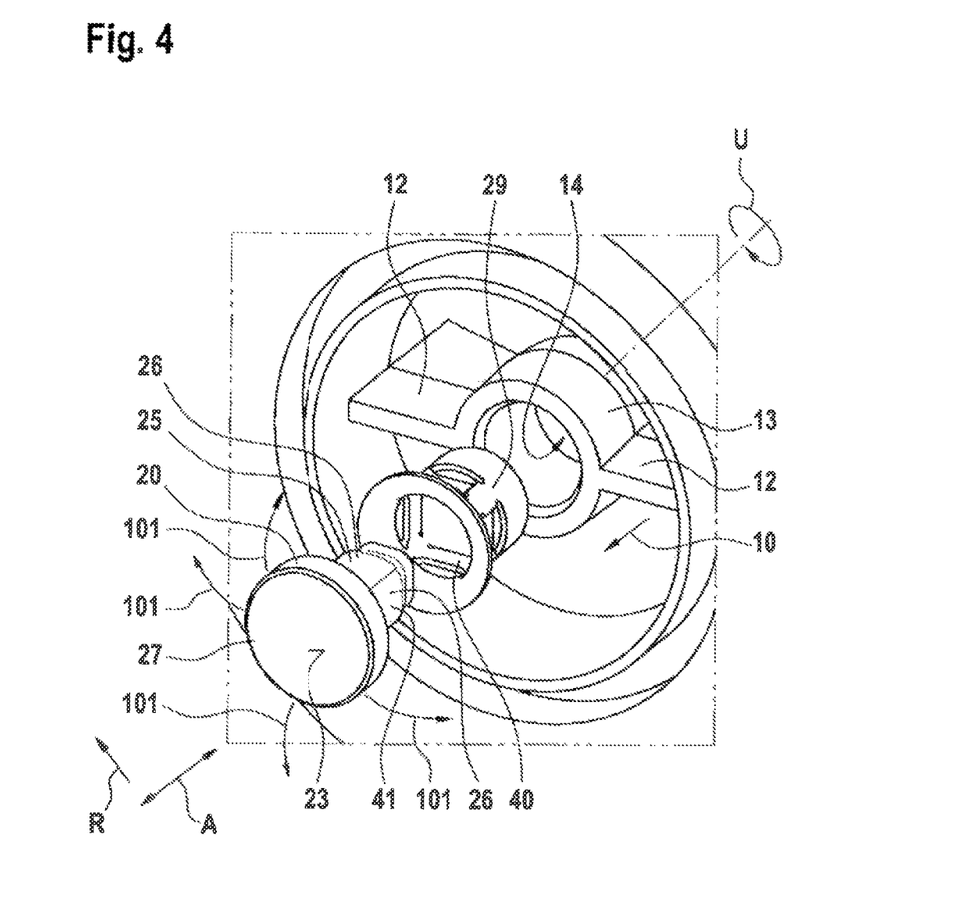
FIG. 4 shows a perspective view of an exploded illustration of a stationary part of the axial sliding bearing arrangement in accordance with the invention in the first embodiment.

FIG. 4 shows the three bearing components, bearing portion 13, bearing bushing 29 and swivel head body 20, in an exploded perspective view. An exposed surface of the swivel head body 20 in this illustration constitutes the second, non-rotating friction surface 23.

A second embodiment of the axial sliding bearing arrangement 2 in accordance with the invention (FIG. 3) is in principle constructed like the first, above-described embodiment of the axial sliding bearing arrangement 2 and differs only in respect of the design of the first spring means 31.

Figure 3:
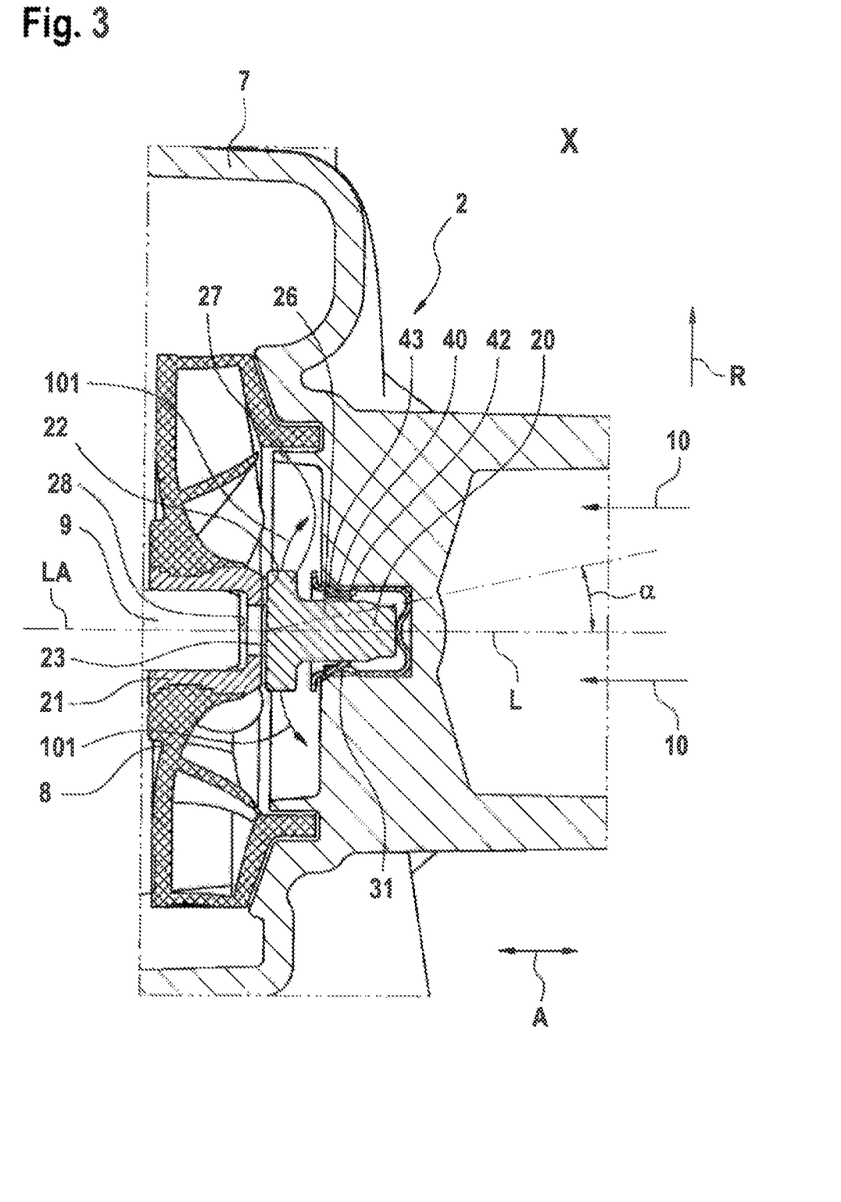
FIG. 3 shows a detail X from FIG. 1 in a second embodiment.

For the remainder, the axial sliding bearing arrangement 2, and also a radial pump 1 fitted with same, is identical to the first embodiment described above.

Figure 5:
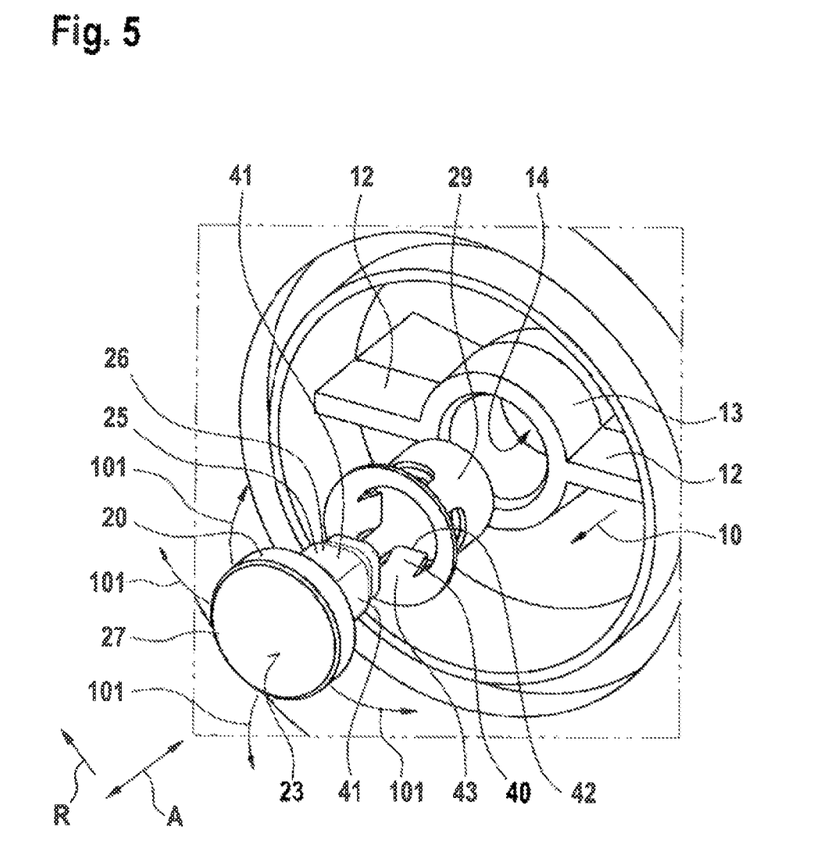
FIG. 5 shows a perspective view of an exploded illustration of a stationary part of the axial sliding bearing arrangement in accordance with the invention in the second embodiment.

In contrast to the formation of the first spring means 31 as spring arms 40 connected at both ends, in the second embodiment as shown in FIGS. 3 and 5 the first spring means 31 are formed as spring arms 40 connected at one and extending in the axial direction A. A free end 42 of the spring arms 40 points in the direction of the inlet 10 in this embodiment of the axial sliding bearing arrangement 2. An opposite, connected end 43 faces the friction portion 27 of the swivel head body 20. Such an arrangement has a certain barb effect for the swivel head body 20 when it is inserted with its holding portion 26 into the bearing bushing 29 and so, in a pre-assembled state, increased protection against loss in the axial direction A is achieved.

Further modifications to the first spring means 31 not illustrated in the drawings may be:

spring arms 40 connected at one end, wherein the connected end 43 faces the inlet 10. In the case of this embodiment, the free end 42 (not shown) faces the friction portion 27 of the swivel head body 20.

as a further possible embodiment, the first spring means 33 of FIGS. 1, 2 and 4, which are connected at both ends, can be disposed extending not in a peripheral direction U but parallel to the axial direction A. Spring arms disposed in the peripheral direction U can also be formed as spring arms 40 which are free at one end.

Figure 6:
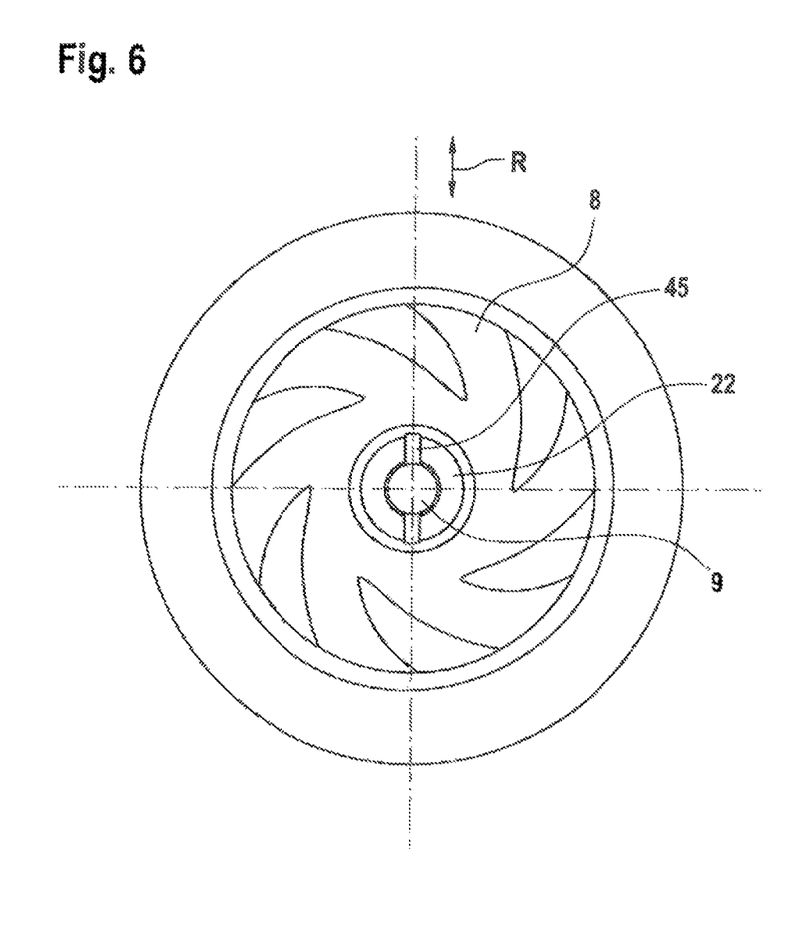
FIG. 6 shows a view of a pump impeller of a radial pump in accordance with the invention comprising a rotating part of the axial sliding bearing arrangement in accordance with the invention in a view towards a rotating friction surface in an axial direction A.

FIG. 6 shows a plan view in the axial direction A of the pump impeller 8, wherein the bearing portion 13 and the bearing struts 12 are hidden. This view corresponds to a plan view of the first, rotating friction surface 22.

The first, rotating friction surface 23 has one or a plurality of grooves 45 which make it possible for fluid to be pumped, which circulates around the friction surfaces 22, 23, to be able to come into the frictional contact of these friction surfaces 22, 23 and therefore to be able effectively to ensure improved cooling as well as lubrication of the friction surfaces.

Further embodiments of the sliding bearing arrangement are described hereinunder with respect to their differences in comparison to the embodiment of FIGS. 1, 2 and 4. Features not mentioned explicitly are identical or comparable to the embodiment of FIGS. 1, 2 and 4 described above, both in what relates to the axial sliding bearing arrangement 2 in accordance with the invention as well as a radial pump 1 comprising the axial sliding bearing arrangement 2 in accordance with the invention. In order to simplify the description, the same components or components with the same function are provided with the same reference numerals already described above.

Figure 7:
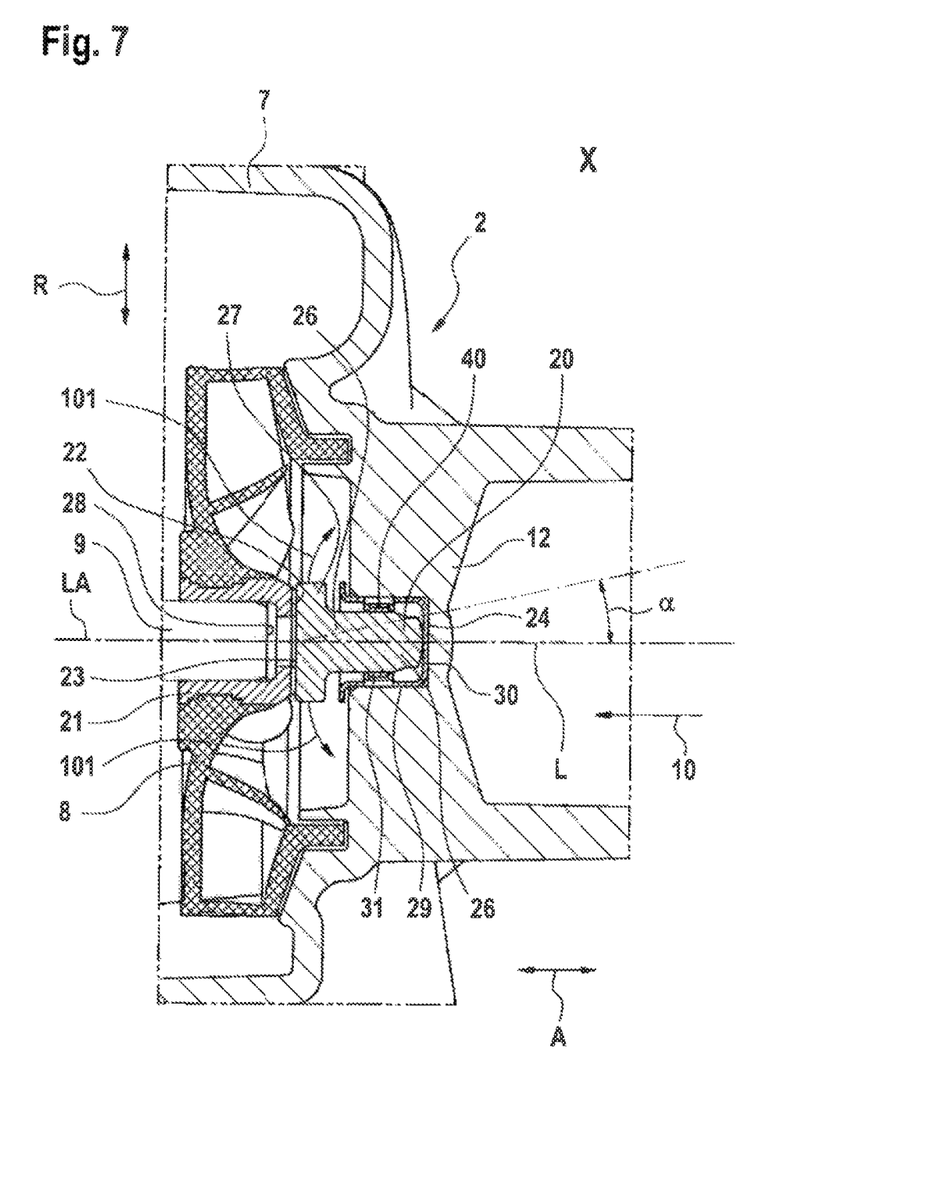
FIG. 7 shows the detail X from FIG. 1 in a third embodiment.

In the case of a third embodiment of the axial sliding bearing arrangement 2 in accordance with the invention (FIG. 7), the base wall of the bearing bushing 29 is flat and has no cap-shaped penetrations. In order to ensure punctiform axial support in spite of this, the axial support surface 24 of the holding portion 26 of the swivel head body 20 is formed in a convexly rounded manner. Such a surface combination results in punctiform contact of the swivel head body 20 with the bearing bushing 29. Such an embodiment is characterised by a construction which is particularly short in the axial direction.

In a further embodiment of the axial sliding bearing arrangement 2 in accordance with the invention (FIG. 8), the base wall of the bearing bushing 29 is pierced and arranged in such a way that a free end of the holding portion 26 of the swivel head body 20, in particular its axial support surface 24, is disposed penetrating through the base wall.

Figure 8:
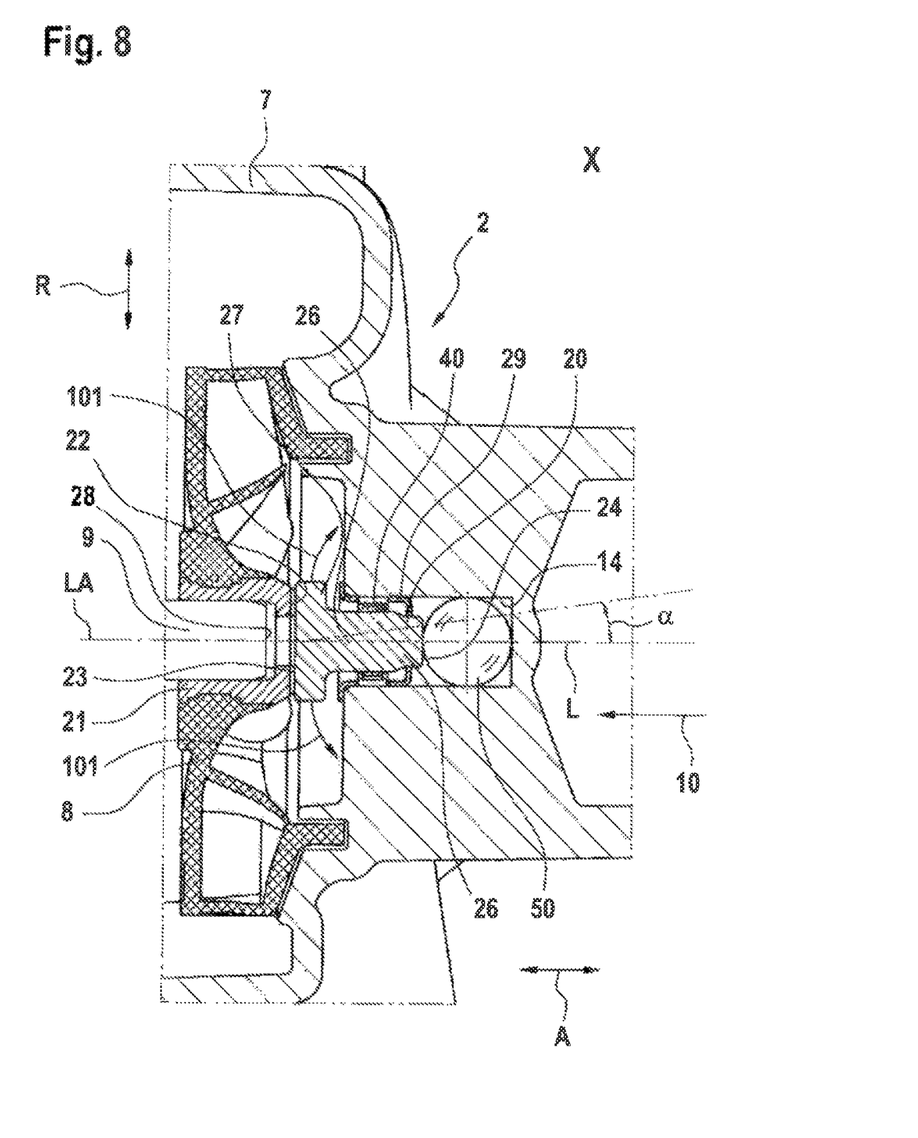
FIG. 8 shows the detail X from FIG. 1 in a fourth embodiment.

Between the bottom of the bearing recess 14 and the axial support surface 24, a ball is inserted as a support element 50 and sits in the bearing recess 14 in a radially fitting manner. The ball is formed e.g. of a hard material, in particular as a glass or steel ball.

Figure 9:
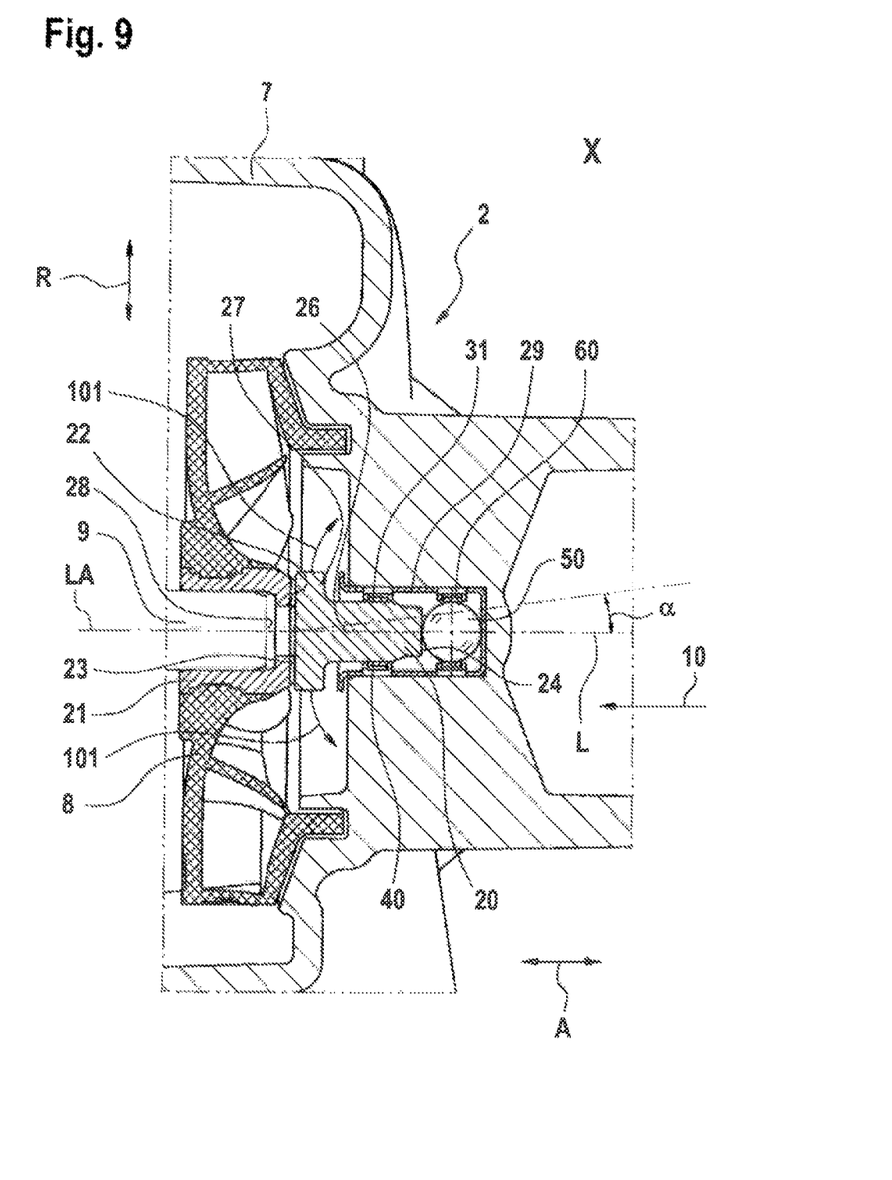
FIG. 9 shows the detail X from FIG. 1 in a fifth embodiment.

In a further embodiment of the invention (FIG. 9), the support element 50 in the form of a ball is received within the bearing bushing 29. The support element 50 (the ball) is axially supported at a flat base wall of the bearing bushing 29. Radially, the support element 50 is held in a resilient manner, second spring means 60 being provided for this purpose. The second spring means 60 can be identical to the first spring means 31 and are merely disposed in the axial direction A on the sleeve body of the bearing bushing 29 in such a way that they can interact with the ball (support element 50).

The second spring elements 60 and the first spring elements 31 do not have to be identical to each other. For instance, different embodiments already described above for the first spring means 31 can also be used for the second spring means 60 independently of the design of the first spring means 31.

Figure 10:
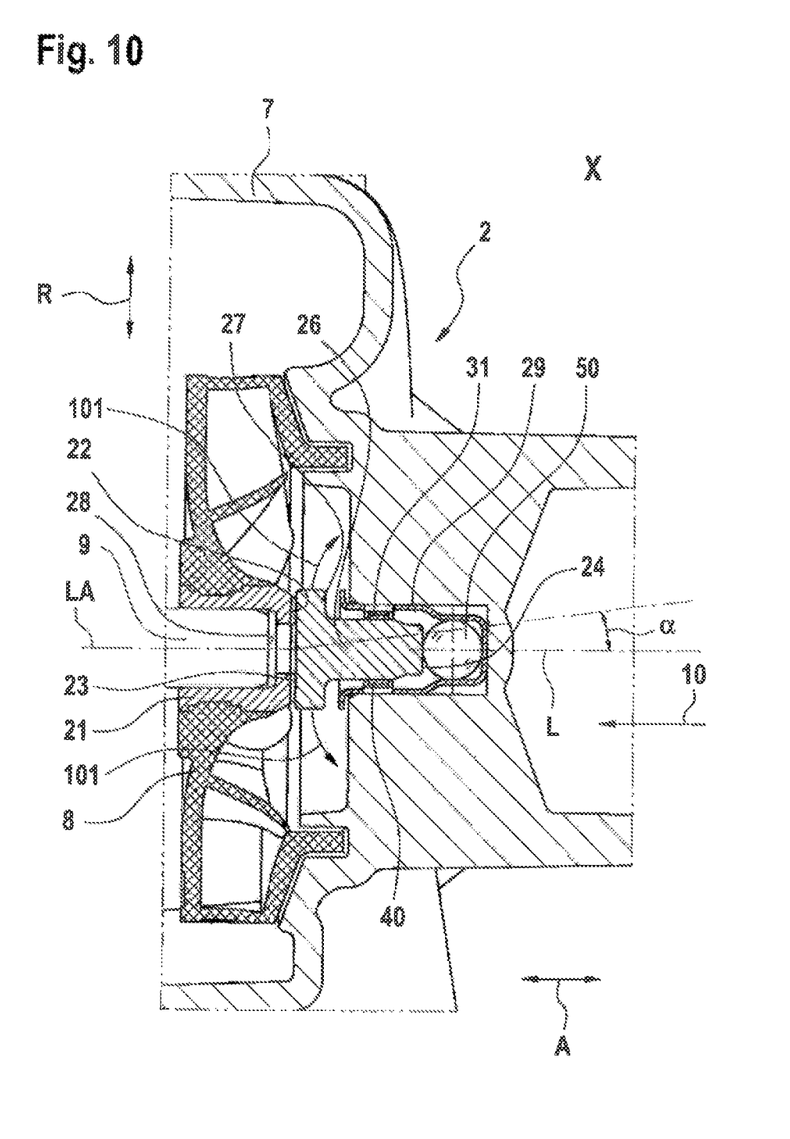
FIG. 10 shows the detail X from FIG. 1 in a sixth embodiment.

In a further embodiment, in FIG. 10, of the axial sliding bearing arrangement 2 in accordance with the invention, the support element 50 is also formed as a ball and sits in a radially narrowed base region of the bearing bushing 29. In the axial direction A, the support element 50 (ball) is supported on the one hand against the base wall of the bearing bushing 29 and on the other hand against the axial support surface 24 of the swivel head body 20. In such an embodiment, the support element 50 is rigidly mounted in the radial direction R apart from wall stiffness of the ball-contacting wall portions of the bearing bushing 29.

For the purpose of centred orientation of the ball (50), the base wall of the bearing bushing (29) can also be curved concavely outwards, wherein the radius of curvature of the base wall of the bearing bushing (29) is preferably somewhat larger than the ball radius. Thus, the ball (50) is held centrally by the axial biasing without provision of an additional radial support. Therefore, in this embodiment, means for radial support of the ball (50) can be omitted. Furthermore, it would also be possible to support and orientate the ball (50) in a central bore (not shown) in the base wall of the bearing bushing (29).

Further modifications and embodiments are described hereinunder which are applicable to all the embodiments mentioned above.

The pump housing 7 can be formed as a cast aluminium part or as an injection moulded synthetic material part. In both variants, the bearing bushing 29 can be formed as a cast-in bushing or a pressed-in bushing. In particular, in the embodiment as an injection moulded synthetic material part it is possible to inject an additional bushing to receive the bearing bushing 29 if necessary.

A glass fibre reinforced synthetic material, e.g. PPS GF40, has proved useful as the material for the pump impeller.

The rotary bushing 21, which may be cast or pressed into the pump impeller as appropriate, can be formed as a metal turned part or as a metal or ceramic sintered component.

The bearing bushing 29 can in particular be formed as a deformed sheet metal part or a stamped component in a suitable alloy.

The swivel head body 20 can in particular be formed as one piece as a sintered ceramic component, e.g. of aluminium oxide. It is also possible to form the friction portion 27 of the swivel head body 20 as a ceramic body in order to increase the wear resistance in the friction contact. Nevertheless, the swivel head body 20 can be formed e.g. as a steel basic body also with a ceramic coating.

A flatness of 0.01 mm and a roughness of 0.0027 mm (Rz value) or 0.0035 mm (Ra value) has proved to be suitable as the surface quality of the friction surfaces, in particular the friction surface of the sintered ceramic component.

In order to produce a defined contact between the rotary bushing 21 and the swivel head body 20, in particular in the region of relatively low rotational speeds and/or relatively low axial forces in the opposite direction to the fluid in-flow direction, a rotor of the drive motor 3 is preferably axially offset with respect to the stator of the drive motor 3 and so a magnetic biasing force is generated which can ensure reliable contact and therefore play-free run up.

Of course, any non-round cross-sectional shape for the holding portion 26, e.g. even a cylindrical shape with a flattened area or a triangular, square or polygonal three-dimensional shape can be provided in order to ensure form-fitting holding of the swivel head body 20 in the bearing bushing 29 with respect to the rotation direction 100.

The invention claimed is:
1. An axial sliding bearing arrangement for a pump impeller of a radial pump comprising a first, rotating friction surface pointing in an axial direction (A);
a second non-rotating friction surface facing the first rotating friction surface;
a swivel head body including the second, non-rotating friction surface, the swivel head body being axially supported via an axial support surface, and the swivel head body being radially supported in a resiliently yielding manner at radial support surfaces by a first spring.

2. The axial sliding bearing arrangement according to claim 1, wherein the axial support surface is supported in the axial direction (A) by a point contact.

3. The axial sliding bearing arrangement according to claim 1, wherein the axial support surface is supported axially rigidly except for material elasticity or in a resiliently yielding manner.

4. The axial sliding bearing arrangement according to claim 1, wherein the first, rotating friction surface has a larger area in contrast to an end surface of a shaft the rotating friction surface is to be mounted.

5. The axial sliding bearing arrangement according to claim 1, wherein a rotary bushing includes the rotating friction surface, the rotary bushing configured and formed to interact in an axially fixed manner, and for conjoint rotation, with a shaft of which the rotary bushing is to be mounted.

6. The axial sliding bearing arrangement according to claim 1, wherein a friction portion of the swivel head body includes the second, non-rotating friction surface, and/or a holding portion of the swivel head body includes the axial support surface and the radial support surfaces.

7. The axial sliding bearing arrangement according to claim 6, wherein the holding portion has a smaller radial extension than the friction portion of the swivel head body.

8. The axial sliding bearing arrangement according to claim 1, wherein the swivel head body is pivotable with its longitudinal axis (L) in at least one direction by an angle ($\alpha$)>0° with respect to the axial direction (A), is pivotable against the first spring.

9. The axial sliding bearing arrangement according to claim 8, wherein the angle $\alpha$ is >0° and less than or equal to 2°.

10. The axial sliding bearing arrangement according to claim 1, wherein a spring stiffness of the first spring moans is configured such that with axial support forces within the axial sliding bearing arrangement, an angular shift of the second, non-rotating friction surface takes place such that a design-imposed maximally possible contact surface between the rotating friction surface and the non-rotating friction surface occurs.

11. The axial sliding bearing arrangement according to claim 1, wherein the axial support surface is supported by a support element with a spherical or cap shape, or a spherical-cap shape.

12. The axial sliding bearing arrangement according to claim 11, wherein the support element is held in a radially resiliently yielding manner inside a bearing bushing by a second spring.

13. The axial sliding bearing arrangement according to claim 1, wherein the first spring includes spring arms free at one end or connected at both ends.

14. The axial sliding bearing arrangement according to claim 1, wherein the swivel head body includes a holding portion with a radial support surface, the holding portion is formed, as viewed in cross-section, circularly, ovally or polygonally, and the first spring and a further second spring interacts in a manner dispersed over a circumference (U) of the radial support surfaces of the holding portion.

15. The axial sliding bearing arrangement according to claim 1, wherein the swivel head body includes a holding portion with an axial support surface formed convexly.

16. The axial sliding bearing arrangement according to claim 1, wherein the first spring and a support element or the first spring are integrally formed as a bearing bushing.

17. The axial sliding bearing arrangement according to claim 1, wherein the first spring respectively interact with flat or arched flat sides of a holding portion of the swivel head body.

18. The axial sliding bearing arrangement according to claim 1, wherein the swivel head body is held rotation resistant in a rotation direction around a longitudinal axis (L).

19. A radial pump comprising at least one axial sliding bearing arrangement according to claim 1.

20. The radial pump according to claim 19, wherein the swivel head body is radially and axially supported with respect to a pump housing.

21. The radial pump according to claim 19, wherein a rotary bushing includes the rotating friction surface, which is formed as one piece with the pump impeller.

22. The radial pump according to claim 19, wherein a rotary bushing includes the rotating friction surface and the rotary bushing has at least one groove at the first, rotating friction surface.

23. The radial pump according to claim 19, wherein the swivel head body is arranged radially in a bearing recess in an inlet of the radial pump.

24. The radial pump according to claim 19, wherein a support element is axially supported at a base of a bearing recess or at a base of a bearing bushing.

25. The radial pump according to claim 19, wherein the radial pump is formed as a dry-runner type pump.

26. The axial sliding bearing arrangement according to claim 1, wherein the swivel head body is pivotable against the first spring.

* * * * *

UNITED STATES PATENT AND TRADEMARK OFFICE
CERTIFICATE OF CORRECTION

PATENT NO. : 11,841,029 B2
APPLICATION NO. : 17/395586
DATED : December 12, 2023
INVENTOR(S) : Paul Michael Ludwig Page 1 of 1

It is certified that error appears in the above-identified patent and that said Letters Patent is hereby corrected as shown below:

In the Claims

Column 13
Line 43, Claim 10      after "spring", delete "moans"

Signed and Sealed this
Twentieth Day of February, 2024

Katherine Kelly Vidal
*Director of the United States Patent and Trademark Office*